United States Patent
Kuo

(10) Patent No.: US 8,875,989 B2
(45) Date of Patent: Nov. 4, 2014

(54) PORTABLE ELECTRONIC APPARATUS, CARD READER AND OPERATION METHOD OF CARD READER

(75) Inventor: Kuan-Ting Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 321 days.

(21) Appl. No.: 13/398,852

(22) Filed: Feb. 17, 2012

(65) Prior Publication Data

US 2013/0092729 A1 Apr. 18, 2013

(30) Foreign Application Priority Data

Oct. 18, 2011 (TW) .............................. 100137703 A

(51) Int. Cl.
| | | |
|---|---|---|
| *G06F 17/00* | (2006.01) | |
| *G09G 3/00* | (2006.01) | |
| *G06F 1/32* | (2006.01) | |
| *G06K 7/08* | (2006.01) | |
| *G06F 1/26* | (2006.01) | |
| *G06F 1/16* | (2006.01) | |
| *G06K 7/00* | (2006.01) | |

(52) U.S. Cl.
CPC .. *G06K 7/00* (2013.01); *G09G 3/00* (2013.01); *Y02B 60/1242* (2013.01); *G06F 1/3225* (2013.01); *G06F 1/32* (2013.01); *G06K 7/083* (2013.01); *G06F 1/3265* (2013.01); *G06F 1/26* (2013.01); *G06F 1/1647* (2013.01); *G06F 1/3287* (2013.01)
USPC .......................................................... 235/375

(58) Field of Classification Search
CPC ................ G03G 15/5004; G03G 2215/00092; G05F 7/00; G06F 13/102; G06F 1/266; G06F 21/34; G06F 2211/007; G06K 19/00; G06K 19/06; G06K 5/00; G06K 7/0008; G06K 7/08; G06K 7/084; G06Q 20/341; G06Q 20/363; G07F 7/1008; H04N 1/00326; H04N 1/00885; H04N 1/00888; H04N 1/00904; H04N 2201/001; H04N 2201/0094
USPC ........................................................ 235/375
See application file for complete search history.

(56) References Cited

U.S. PATENT DOCUMENTS 5,247,164 A * 9/1993 Takahashi ..................... 235/492
5,742,756 A * 4/1998 Dillaway et al. ................ 726/20
5,911,080 A * 6/1999 Yeom ............................ 713/300

(Continued)

FOREIGN PATENT DOCUMENTS

| TW | M274594 | 9/2005 |
| TW | 201005506 | 2/2010 |
| TW | 201011520 | 3/2010 |

*Primary Examiner* — Thien M Le
*Assistant Examiner* — Tae Kim
(74) *Attorney, Agent, or Firm* — Jianq Chyun IP Office

(57) ABSTRACT

A card reader that is connected to a portable electronic apparatus includes a processor and a memory card controller. The processor receives a trigger signal from the portable electronic apparatus when the portable electronic apparatus is in a standby mode. The memory card controller detects whether at least one memory card is inserted into the card reader and generates a memory card inserting status accordingly. The portable electronic apparatus provides a standby power to the card reader and a first screen based on the trigger signal. The processor receives the memory card inserting status; according to the memory card inserting status, the processor reads contents of the memory card, so that the contents of the memory card are displayed on the first screen.

15 Claims, 3 Drawing Sheets

(56) References Cited

U.S. PATENT DOCUMENTS

| | | | |
|---|---|---|---|
| 6,111,522 A * | 8/2000 | Hiltz et al. | 340/932.2 |
| 7,818,443 B2 | 10/2010 | Du et al. | |
| 2006/0149977 A1 * | 7/2006 | Cooper | 713/300 |
| 2007/0162187 A1 | 7/2007 | Ishiguro et al. | |
| 2009/0046326 A1 * | 2/2009 | Nakajo et al. | 358/448 |
| 2010/0193586 A1 * | 8/2010 | Iwashima | 235/380 |
| 2014/0006277 A1 * | 1/2014 | Rao | 705/41 |

* cited by examiner

PORTABLE ELECTRONIC APPARATUS, CARD READER AND OPERATION METHOD OF CARD READER

CROSS-REFERENCE TO RELATED APPLICATION

This application claims the priority benefit of Taiwan application serial no. 100137703, filed Oct. 18, 2011. The entirety of the above-mentioned patent application is hereby incorporated by reference herein and made a part of this specification.

BACKGROUND OF THE INVENTION

1. Field of the Invention

The invention relates to a portable electronic apparatus and its card reader, and more particularly to an apparatus and a method of activating a card reader by employing standby power.

2. Description of Related Art

Among the existing portable electronic apparatuses, various energy-saving designs are developed for the portable electronic apparatuses powered by batteries.

However, in an exemplary notebook computer among the portable electronic apparatuses, even though the notebook computer may be employed to perform simple tasks in no need of consuming significant power, it is necessary to boot the computer and activate relevant software and hardware (e.g., a hard disk drive, a central processing unit, an operating system, etc.) required for booting the computer. This leads to long booting time and unnecessary consumption on electricity, which significantly affects the operating efficiency of the notebook computer.

SUMMARY OF THE INVENTION

The invention is directed to a card reader that merely employs standby power to display data contents of a memory card in the card reader.

The invention is further directed to a portable electronic apparatus that supplies standby power when the portable electronic apparatus is in a standby mode, such that the card reader in the portable electronic apparatus can display data contents of a memory card in the card reader.

The invention is further directed to an operation method of a card reader. In the operation method, data contents of a memory card in the card reader are displayed by employing standby power.

In an embodiment of the invention, a card reader connected to a portable electronic apparatus includes a processor and a memory card controller. The processor is coupled to the portable electronic apparatus and a first screen. When the portable electronic apparatus is in a standby mode, the processor receives a trigger signal from the portable electronic apparatus. The memory card controller is coupled to the processor. The memory card controller detects whether at least one memory card is inserted into the card reader and generates a memory card inserting status accordingly. The portable electronic apparatus provides a standby power to the card reader and the first screen based on the trigger signal. The processor receives the memory card inserting status; according to the memory card inserting status, the processor reads contents of the memory card for displaying the contents on the first screen.

According to an embodiment of the invention, when the trigger signal is enabled, the card reader and the first screen receive the standby power supplied by the portable electronic apparatus.

According to an embodiment of the invention, when the memory card inserting status indicates that at least one memory card is inserted into the card reader, the processor reads the contents of the memory card, and the contents of the memory card are displayed on the first screen.

According to an embodiment of the invention, when the memory card inserting status indicates that no memory card is inserted into the card reader, the processor drives the card reader and the first screen to enter into the standby mode.

In an embodiment of the invention, a portable electronic apparatus that includes a key, an embedded controller, a first screen, and a card reader is provided. The embedded controller is coupled to the key. When the portable electronic apparatus is in a standby mode, the embedded controller generates a trigger signal based on a pressed mode of the key. The card reader is coupled to the embedded controller and the first screen. Besides, the card reader includes a processor and a memory card controller. The processor is coupled to the embedded controller and the first screen, and the processor receives the trigger signal from the embedded controller. The memory card controller is coupled to the processor. Besides, the memory card controller detects whether at least one memory card is inserted into the card reader and accordingly generates a memory card inserting status. Here, the embedded controller provides a standby power to the card reader and the first screen based on the pressed mode, and the processor receives the memory card inserting status and reads contents of the memory card according to the memory card inserting status, such that the contents of the memory card are displayed on the first screen.

According to an embodiment of the invention, the first screen is built in an integrated screen.

According to an embodiment of the invention, the embedded controller is a keypad controller.

In an embodiment of the invention, an operation method of a card reader is provided, and the card reader is connected to a portable electronic apparatus and a first screen. The operation method includes receiving a trigger signal from the portable electronic apparatus when the portable electronic apparatus is in a standby mode; receiving a standby power from the portable electronic apparatus based on the trigger signal and supplying the standby power to the first screen (e.g., an electronic paper screen) and the card reader; detecting whether at least one memory card is inserted into the card reader based on the trigger signal and generating a memory card inserting status accordingly; reading contents of the memory card according to the memory card inserting status and displaying the contents of the memory card on the electronic paper screen.

Based on the above, the portable electronic apparatus in the standby mode supplies the standby power to the card reader. In addition, when at least one memory card is inserted into the card reader, the contents of the memory card are displayed on the first screen. Thereby, even though the portable electronic apparatus is in the standby mode, it is possible to merely employ the standby power to read electronic data or perform tasks that require insignificant power. Thereby, power consumption can be reduced in an effective manner.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated

DETAILED DESCRIPTION OF DISCLOSED EXEMPLARY EMBODIMENTS

Figure 1:
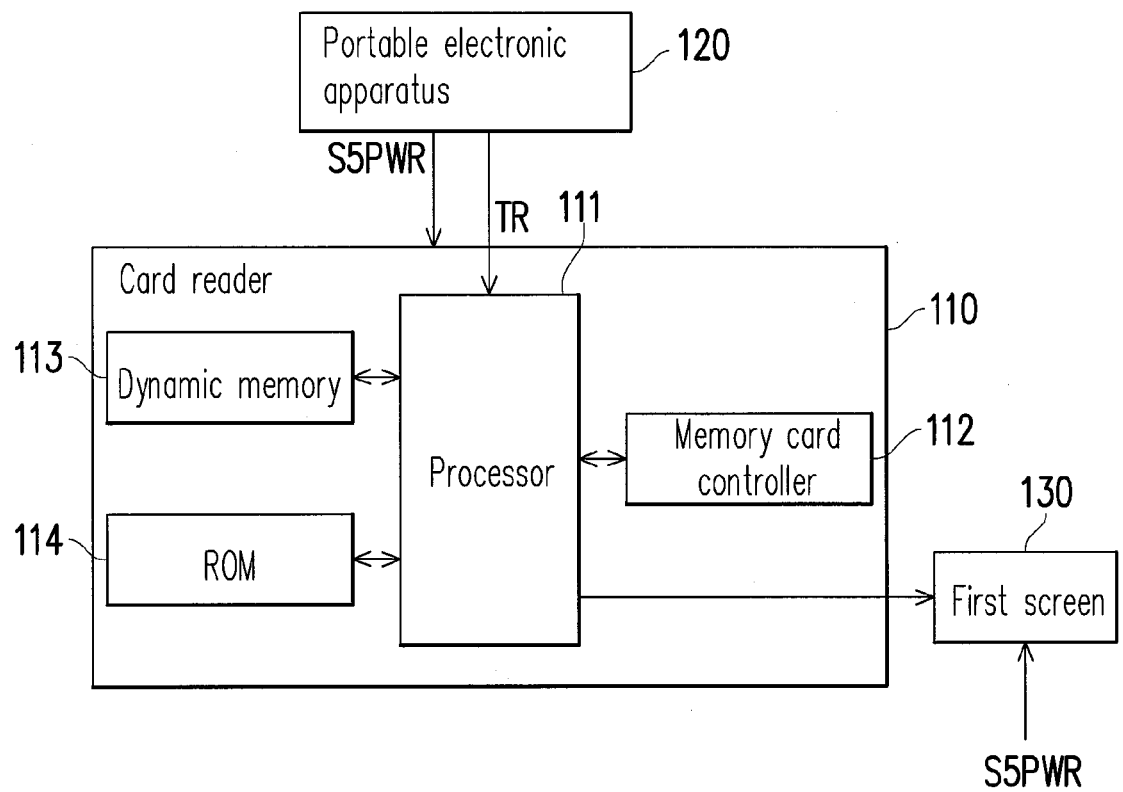
FIG. 1 is a schematic view illustrating a card reader 110 according to an embodiment of the invention.

Please refer to FIG. 1 that schematically illustrates a card reader 110 according to an embodiment of the invention. The card reader 110 is connected to a portable electronic apparatus 120 and coupled to a first screen 130. The first screen 130 may be an electronic paper screen, e.g., an electrophoretic screen, which should not be otherwise construed as a limitation to the invention. The card reader 110 includes a processor 111, a memory card controller 112, a dynamic memory 113, and a read-only memory (ROM) 114. The processor 111 is coupled to the portable electronic apparatus 120 and the first screen 130. Besides, the processor 111 receives a trigger signal TR from the portable electronic apparatus 120. The memory card controller 112 is coupled to the processor 111. Additionally, the memory card controller 112 serves to detect whether at least one memory card is inserted into the card reader 110 and generates a memory card inserting status accordingly.

As to the actual operation of the card reader 110, when the portable electronic apparatus 120 is in a standby mode (e.g., an S5 standby mode), a user may press a certain key or trigger a mechanism, such that the portable electronic apparatus 120 can generate the trigger signal TR correspondingly. The trigger signal TR is transmitted from the portable electronic apparatus 120 to the processor 111 of the card reader 110. When the trigger signal TR received by the processor 111 is enabled, the processor 111 drives the memory card controller 112 to detect whether at least one memory card is effectively inserted into the card reader 110. The memory card controller 112 accordingly generates relevant signals indicating the memory card inserting status and transmits the detected memory card inserting status back to the processor 111. It should be mentioned that the processor 111 does not perform any operation when the trigger signal TR received by the processor 111 is disabled.

Moreover, the portable electronic apparatus 120 provides a standby power S5PWR to the card reader 110 and the first screen 130 after the user triggers the mechanism. The card reader 110 and the first screen 130 then make use of the standby power S5PWR as the operation power.

After the processor 111 receives the memory card inserting status transmitted by the memory card controller 112, and when the memory card inserting status indicates that at least one memory card is effectively inserted into the card reader 110, the inserted memory card is read, and the read contents (including texts and/or pictures) are transmitted to the first screen 130, such that the contents can be displayed on the first screen 130. On the contrary, when the memory card inserting status received by the processor 111 indicates that no memory card is effectively inserted into the card reader 110, the processor 111 drives the card reader 110 and the first screen 130 to both enter into the standby mode.

Note that all components in the card reader 110 and the first screen 130 are operated merely by using the standby power S5PWR as the operation power. It can thus be learned that the card reader 110 described in this embodiment is able to perform functions of reading texts or watching pictures when the portable electronic apparatus 120 is merely capable of supplying the standby power S5PWR.

The ROM 114 and the dynamic memory 113 coupled to the processor 111 serve to store relevant data required for operating the processor 111.

Figure 2:
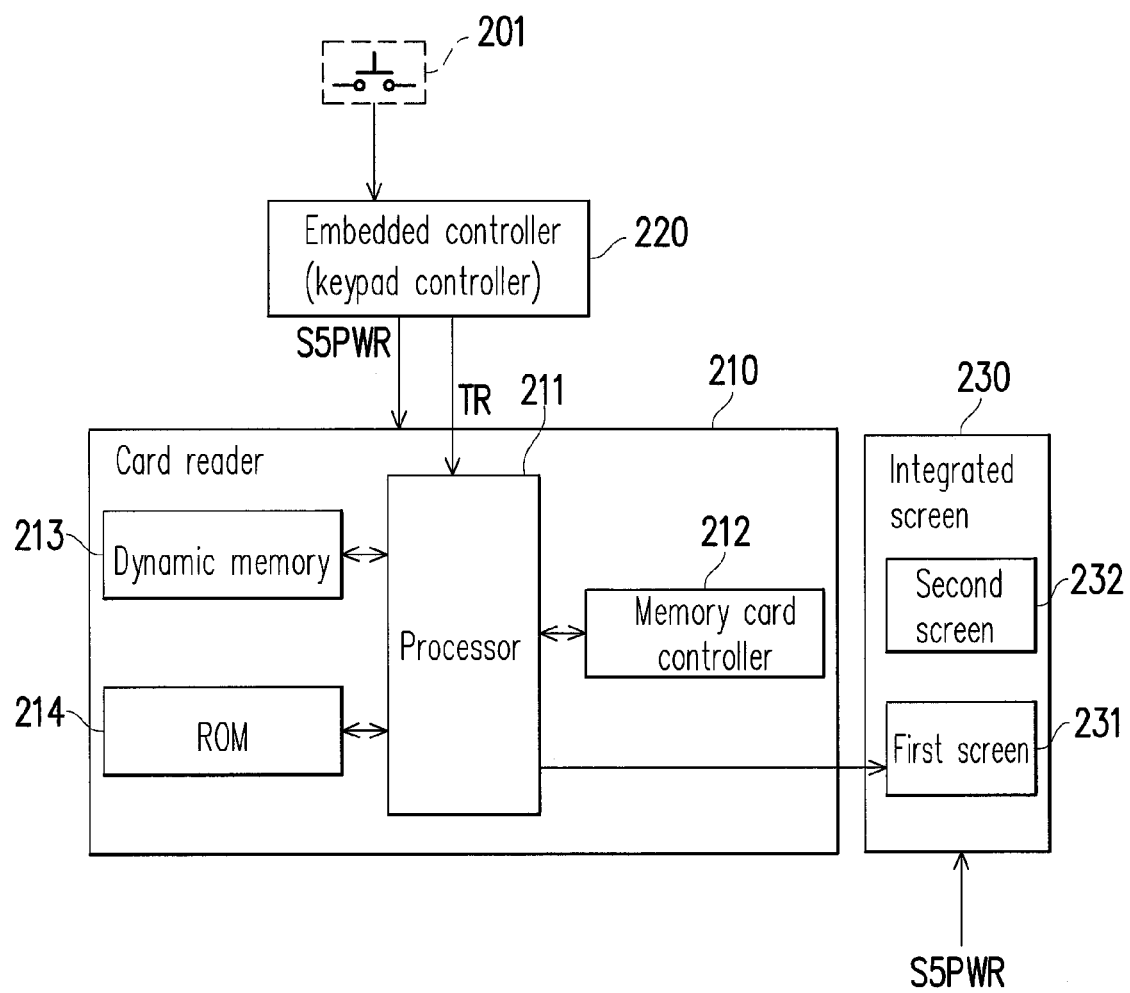
FIG. 2 is a schematic view illustrating a portable electronic apparatus 200 according to an embodiment of the invention.

Please refer to FIG. 2 which schematically illustrates a portable electronic apparatus 200 according to an embodiment of the invention. The portable electronic apparatus 200 includes a key 201, a card reader 210, an embedded controller 220, and an integrated screen 230. The integrated screen 230 includes a first screen 231 and a second screen 232. The first screen 231 may be an electronic paper screen, for instance. The second screen 232 may be a liquid crystal screen, for instance. The embedded controller 220 is coupled to the key 201. Besides, the embedded controller 220 detects a press mode of the key 201 and accordingly generates the trigger signal TR based on the press mode. The card reader 210 is coupled to the embedded controller 220 and the first screen 231 of the integrated screen 230. In addition, the card reader 210 includes a processor 211, a memory card controller 212, a dynamic memory 231, and a read-only memory (ROM) 214.

As to the actual operation of the portable electronic apparatus 200, when the portable electronic apparatus 200 is in a standby mode (e.g., an S5 standby mode), the embedded controller 220 detects the key 201 and correspondingly generates the trigger signal TR while the key 201 is pressed. When the embedded controller 220 detects the press mode of the key 201, the embedded controller 220 correspondingly supplies the standby power S5PWR to the card reader 210 and the first screen 231.

After the card reader 210 receives the standby power S5PWR provided by the embedded controller 220 as the operation power, the processor 211 drives the memory card controller 212 to detect whether at least one memory card is effectively inserted into the card reader 210. When at least one memory card is effectively inserted into the card reader 210, the processor 211 reads the contents of the memory card and displays the contents of the memory card on the first screen 231. Note that the operation details of the card reader 210 are the same as those of the card reader 110 described in the previous embodiment. Therefore, relevant descriptions can be referred to as those provided above and will not be further provided. It should be mentioned that the embedded controller 220 may be a keypad controller.

In this embodiment, the integrated screen 230 further includes a second screen 232, e.g., a liquid crystal screen. The second screen 232 can, together with a conventional backlight plate, perform the display function. In most cases, the second screen 232 is the main display screen of an exemplary notebook computer, and the second screen 232 performs the display function when the notebook computer is in an operation mode.

The second screen 232 may also be overlapped with the first screen 231, so as to constitute the integrated screen 230. Alternatively, the second screen 232 may also be separated from the first screen 231. In an exemplary notebook computer, the first screen 231 may be configured on the top cover of the notebook computer and at a side opposite to the second screen 232.

It should be mentioned that the key 201 may be a single key configured on the keypad of the portable electronic apparatus 200 (e.g., a notebook computer) or may refer to plural keys on the keypad. Besides, the key 201 may be configured at any location on the casing of the portable electronic apparatus 200.

Note that the card reader 210 may be built in the portable electronic apparatus 200 or may be connected to the portable electronic apparatus 200 via a universal serial bus (USB), for instance.

Figure 3:
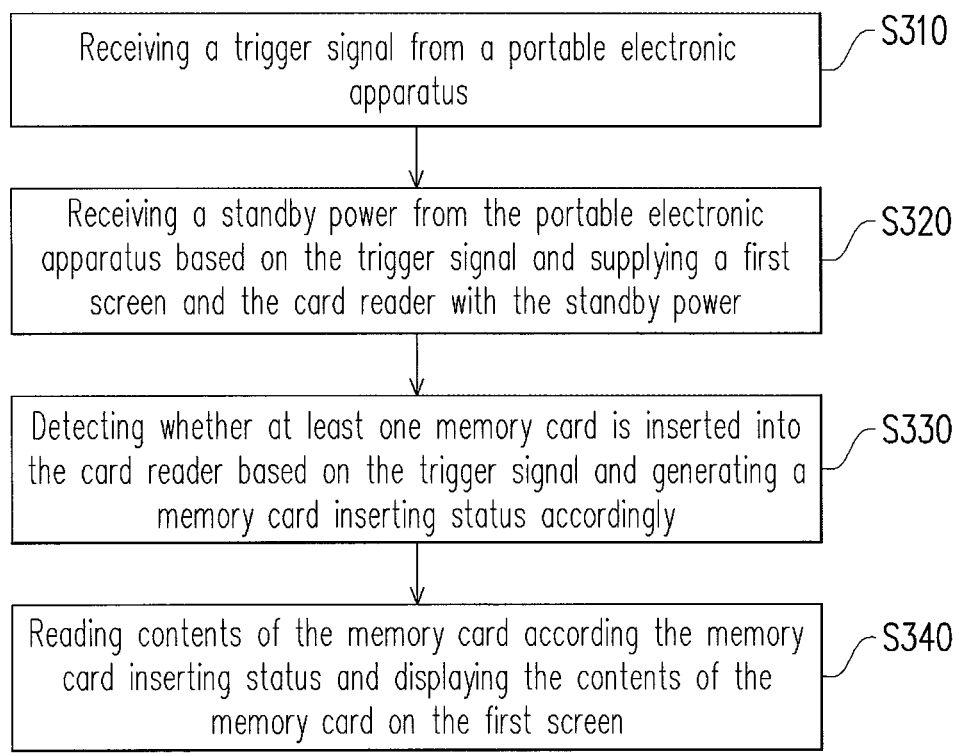
FIG. 3 is a flow chart illustrating an operation method of a card reader according to an embodiment of the invention.

Please refer to FIG. 3. Specifically, FIG. 3 is a flow chart illustrating an operation method of a card reader according to an embodiment of the invention. The operation method includes: receiving a trigger signal from a portable electronic apparatus (S310); receiving a standby power from the portable electronic apparatus based on the trigger signal and supplying a first screen and the card reader with the standby power (S320); detecting whether at least one memory card is inserted into the card reader based on the trigger signal and generating a memory card inserting status accordingly (S330); reading contents of the memory card according to the memory card inserting status and displaying the contents of the memory card on the first screen (S340). The details of performing said steps by the card reader are clearly described in the afore-mentioned embodiments, and thus no further description is provided herein.

In light of the foregoing, through a user's simple trigger action, the portable electronic apparatus in the standby mode can supply the standby power to the card reader and the first screen. The card reader and the first screen may merely utilize the standby power as the operation power to read the data stored in the memory card in the card reader, and the data stored in the memory card can then be displayed on the first screen. Thereby, even though the portable electronic apparatus is not booted, it is possible for the first screen to perform the display function, which effectively improves the operation efficiency of the portable electronic apparatus.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A card reader, connected to a portable electronic apparatus, the card reader comprising:
a processor, coupled to the portable electronic apparatus and a first screen, wherein the processor receives a trigger signal from the portable electronic apparatus when the portable electronic apparatus is in a standby mode; and
a memory card controller, coupled to the processor, the memory card controller detecting whether at least one memory card is inserted into the card reader and generating a memory card inserting status accordingly,
wherein the portable electronic apparatus provides a standby power to the card reader and the first screen based on the trigger signal, and the processor receives the memory card inserting status and reads contents of the memory card based on the standby power according to the memory card inserting status, such that the contents of the memory card are displayed on the first screen based on the standby power.

2. The card reader as recited in claim 1, wherein when the trigger signal is enabled, the card reader and the first screen receive the standby power supplied by the portable electronic apparatus.

3. The card reader as recited in claim 2, wherein when the memory card inserting status indicates that at least one memory card is inserted into the card reader, the processor reads the contents of the memory card, and the contents of the memory card are displayed on the first screen.

4. The card reader as recited in claim 1, wherein when the memory card inserting status indicates that no memory card is inserted into the card reader, the processor drives the card reader and the first screen to enter the standby mode.

5. A portable electronic apparatus comprising:
a key;
an embedded controller coupled to the key, wherein when the portable electronic apparatus is in a standby mode, the portable electronic apparatus generates a trigger signal based on a pressed mode of the key;
a first screen; and
a card reader coupled to the embedded controller and the first screen, the card reader comprising:
a processor coupled to the embedded controller and the first screen, the processor receiving the trigger signal from the embedded controller; and
a memory card controller coupled to the processor, the memory card controller detecting whether at least one memory card is inserted into the card reader and generating a memory card inserting status accordingly,
wherein the embedded controller provides a standby power to the card reader and the first screen based on the pressed mode, and the processor receives the memory card inserting status and reads contents of the memory card based on the standby power according to the memory card inserting status, such that the contents of the memory card are displayed on the first screen based on the standby power.

6. The portable electronic apparatus as recited in claim 5, wherein the embedded controller further provides the standby power to the card reader and the first screen based on the pressed mode of the key.

7. The portable electronic apparatus as recited in claim 6, wherein when the memory card inserting status indicates that at least one memory card is inserted into the card reader, the processor reads the contents of the memory card, and the contents of the memory card are displayed on the first screen.

8. The portable electronic apparatus as recited in claim 5, wherein when the memory card inserting status indicates that no memory card is inserted into the card reader, the processor drives the card reader and the first screen to enter the standby mode.

9. The portable electronic apparatus as recited in claim 5, wherein the first screen is built in an integrated screen.

10. The portable electronic apparatus as recited in claim 5, wherein the embedded controller is a keypad controller.

11. The portable electronic apparatus as recited in claim 5, wherein the first screen is an electronic paper screen.

12. An operation method of a card reader, the card reader being connected to a portable electronic apparatus and a first screen, the operation method comprising:
receiving a trigger signal from the portable electronic apparatus when the portable electronic apparatus is in a standby mode;
receiving a standby power from the portable electronic apparatus based on the trigger signal and supplying the standby power to the first screen and the card reader;
detecting whether at least one memory card is inserted into the card reader based on the trigger signal and generating a memory card inserting status accordingly; and
reading contents of the memory card based on the standby power according to the memory card inserting status and displaying the contents of the memory card on the first screen based on the standby power.

13. The operation method as recited in claim 12, wherein the step of receiving the standby power from the portable electronic apparatus based on the trigger signal comprises:
   receiving the standby power from the portable electronic apparatus while the trigger signal is enabled.

14. The operation method as recited in claim 12, wherein the step of reading the contents of the memory card and displaying the contents of the memory card on the first screen comprises:
   reading the contents of the memory card and displaying the contents of the memory card on the first screen while the memory card inserting status indicates that at least one memory card is inserted into the card reader.

15. The operation method as recited in claim 14 further comprising:
   driving the card reader and the first screen to enter into the standby mode while the memory card inserting status indicates that no memory card is inserted into the card reader.

* * * * *